Figure 1:
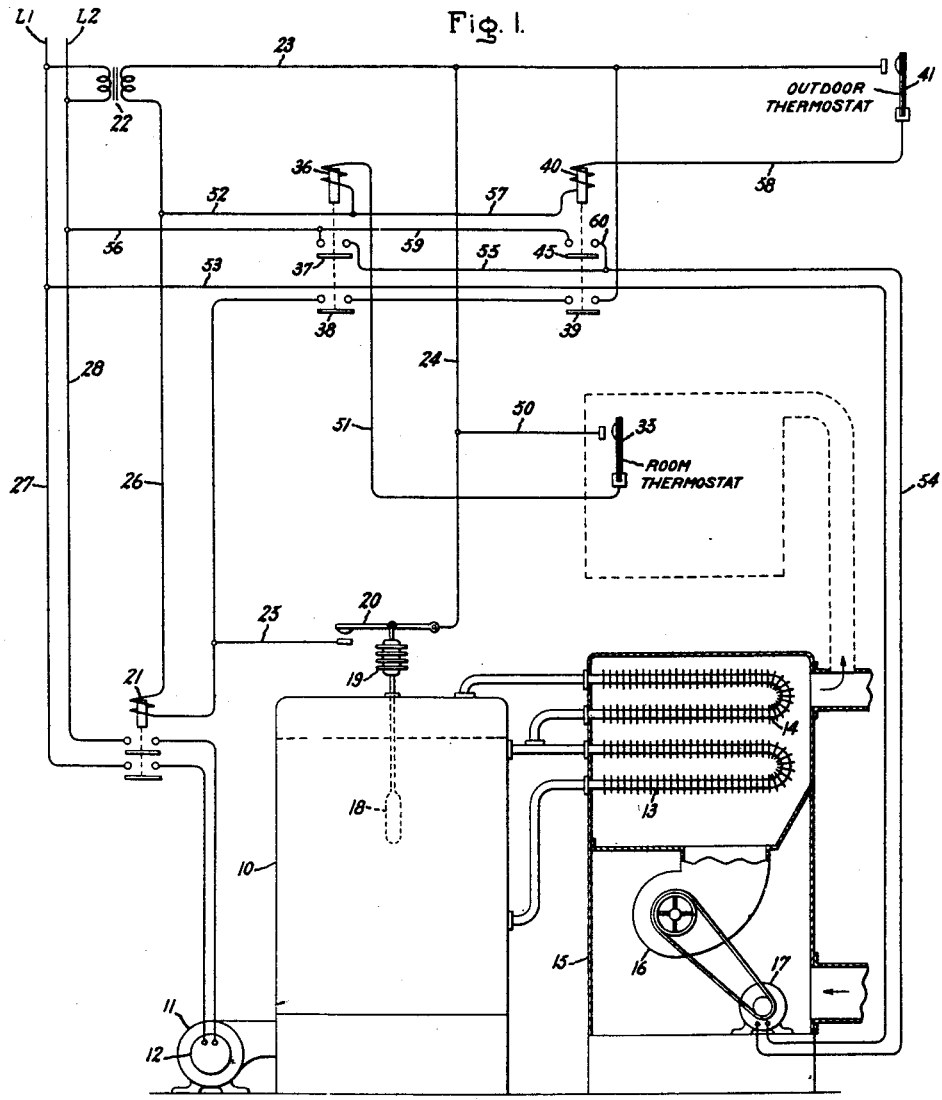

Dec. 26, 1944.   H. R. CRAGO   2,366,003

HEATING SYSTEM

Filed June 16, 1943   2 Sheets-Sheet 1

Inventor:
Harry R. Crago,
by Harry E. Dunham
His Attorney.

Dec. 26, 1944.   H. R. CRAGO   2,366,003
HEATING SYSTEM
Filed June 16, 1943   2 Sheets-Sheet 2
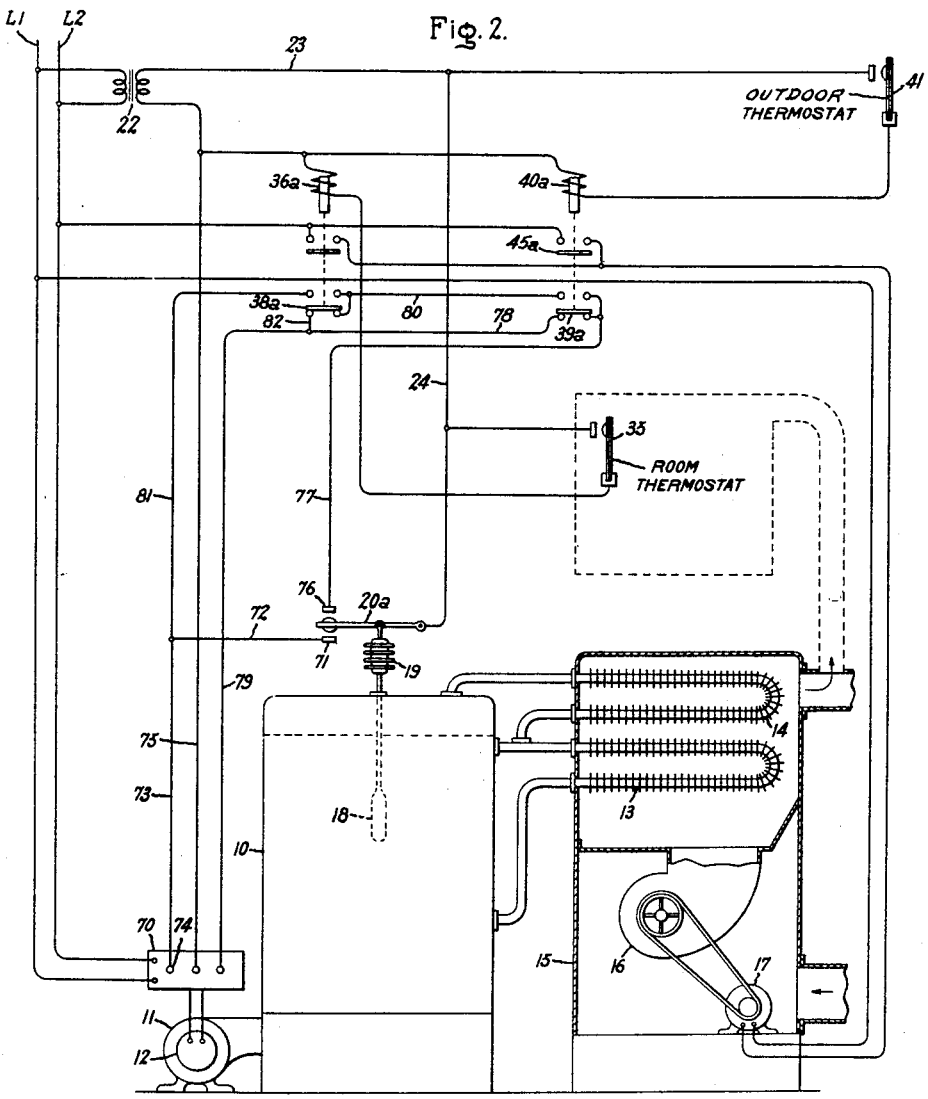
Inventor:
Harry R. Crago,
by Harry E. Dunham
His Attorney.

Patented Dec. 26, 1944

2,366,003

UNITED STATES PATENT OFFICE 2,366,003

HEATING SYSTEM

Harry R. Crago, Schenectady, N. Y., assignor to General Electric Company, a corporation of New York Application June 16, 1943, Serial No. 490,983

12 Claims. (Cl. 237—2)

The invention relates to heating systems, particularly automatically controlled heating systems employing a circulating heat transfer medium.

The principal object is to provide an improved heating system wherein both the circulation and the heating of the heat transfer medium are separately, jointly, and interchangeably controlled automatically under different heating conditions.

Another object is to control automatically the circulation and heating of the heat transfer medium selectively in response to both temperature and heating load variations.

A further object is to enable the circulation of the heat transfer medium to be started and stopped automatically in a low heating load range responsively to variations in a predetermined temperature from a desired value and to enable, in a high heating load range, continuous circulation of the heat transfer medium with the heating thereof controlled automatically in response to the same variations in the predetermined temperature from the desired value.

A still further object is to provide an improved heating system having a heat transfer medium heating element of low heat output operating continuously, and a circulator for the medium controlled thermostatically to maintain a desired temperature as long as the low heat output is sufficient to supply the heating load, and also provided with a load responsive control means for operating the heat transfer medium circulator continuously when the heating load exceeds a predetermined value, together with a supplemental heat transfer medium heating element that is interchangeable with the circulator so as to be thermostatically controlled to maintain the desired temperature under heavy heating load conditions.

An additional object is to provide an improved thermostatically controlled heating system wherein the circulation and the heating of a heat transfer medium may be separately varied for maintaining a desired temperature inside an insulated space and wherein an auxiliary thermostat responsive to the outside or ambient temperature that determines the heating load is provided with means for interchanging the main thermostat that is responsive to the inside space temperature to variably control either the circulation or the heating of the heat transfer medium under different outside or ambient temperature conditions.

A specific object is to provide an improved heating system especially adapted for air conditioning and having a boiler furnace provided with both steam and hot water elements for heating the conditioned air, and normally operating below the steaming temperature so as thereby to increase the thermostatically controlled circulation of properly tempered conditioned air required to maintain a desired room temperature when the outdoor or ambient temperature is relatively high and having a load responsive control means in the form of an outdoor thermostat for operating the air circulator continuously and effecting steaming operation of the boiler furnace under thermostatic control to maintain the desired room temperature whenever the outdoor temperature falls below a predetermined value.

Further objects and advantages will appear in the following description of the accompanying drawings illustrating preferred embodiments of the invention, and in which Fig. 1 is a schematic diagram of an air conditioning heating system embodying the improvements of the present invention; and Fig. 2 is a schematic diagram of an air conditioning heating system having a modified form of control.

In the air conditioning heating system schematically shown in Fig. 1, the means for heating the air comprises the boiler furnace 10 in which the heat is generated by means of the burner mechanism 11 that is driven by the electric motor 12. Both the boiler furnace 10 and the burner 11 may be of any well known conventional type. The boiler furnace 10 is provided with a hot water air heating element 13 of relatively low heat output capacity for insuring proper tempering of the circulated air at all times and with a supplemental steam heating element 14 for heating the air under heavy loads. Both the hot water heating element 13 and the steam heating element 14 may be of the ordinary tube and fin type adapted to transfer heat to the air that is circulated through the air conditioning apparatus 15 by the air circulating blower 16 that is driven by the electric motor 17.

In accordance with the present invention, the hot water heating element 13 is operated continuously to temper the circulated air when the heating load requirements are relatively low while the supplemental steam heating element 14 is operated under thermostatic control to supply the additional heat required under heavy load conditions. In order to maintain the hot water air tempering element 13 continuously effective, the boiler furnace 10 is provided with an automatic control shown in the form of a bulb 18 that is responsive to the boiler water temperature and an expansible bellows 19 for operating a control switch 20 to effect operation of the burner 11 sufficiently to maintain the boiler water at a desired temperature below the steaming value. The control device, comprising elements 18, 19, and 20, constitutes a well known form of boiler aquastat.

The aquastat contact arm 20 controls the energization of the starting relay 21 for the burner driving motor 12 through a circuit that is energized from the low voltage secondary of the transformer 22 through the conductors 23, 24, 25 and 26. In this way the burner of the driving motor 12 is energized from the supply lines L1, L2 through the conductors 27, 28 when the motor starting relay 21 is energized and closes its contacts. The aquastat contact 20 energizes the motor starting relay 21 whenever the boiler water falls below a predetermined temperature and deenergizes relay 21 when the boiler water temperature increases above the predetermined value. As a result, the hot water heating element 13 is continuously supplied by thermosiphon action with hot water from the boiler 10 and is thus maintained continuously effective for heating the air circulated through the air conditioner 15.

Under light heating load conditions such as occur when the outdoor or ambient temperature is relatively high, the operation of the air circulating driving motor 17 is thermostatically controlled by means of the room thermostat 35 which, as indicated by the dotted lines, is responsive to the temperature of the air in the room supplied by the air conditioning apparatus 15. The heating load supplied by the air conditioning apparatus 15 varies in accordance with the heat loss from the room and this heat loss varies principally with the difference between the room temperature and the outdoor or ambient temperature. Consequently, if the room temperature is maintained substantially constant, the heating load necessarily will vary substantially inversely with the outdoor or ambient temperature, i. e., the temperature of the atmosphere or the encompassing or surrounding medium into which the heat loss is dissipated. The room thermostat 35 controls the energization of the relay 36 that is provided with a pair of normally open contacts 37, 38. Contact 37 is connected to control the energization of the air circulator driving motor 17 from the supply lines L1, L2, while contact 38 is connected to control the energization of the burner motor starting relay 21, this latter control, however, being joint with the contact 39 of relay 40 that is operated under the control of the outdoor temperature responsive thermostat 41. The arrangement is such that as long as the outdoor temperature is above a predetermined value, the outdoor thermostat 41 maintains relay 40 deenergized so that when relay 36 is energized under the control of the room thermostat 35, the closure of contact 38 is ineffective to energize the burner driving motor starting relay 21. However, the closure of relay contact 37 is effective while the outdoor temperature remains above the predetermined value to start and stop operation of the air circulator under the control of the room thermostat 35 so as to maintain a predetermined room temperature.

The room thermostat 35 and the outdoor temperature responsive thermostat 41 are, in accordance with the present invention, interconnected so as to effect separate, joint and interchangeable operation of the air circulating apparatus and the supplemental air heating element 14 under different heating conditions. This is accomplished by interconnecting the control relays 36 and 40 so that they jointly control the energization of the burner driving motor starting relay 21 and separately control the energization of the air circulator driving motor 17 to effect selective operation of the air circulating means and the air heating means as follows.

*Operation of Fig. 1*

The hot water heating element 13 is, as previously pointed out, continuously effective since it is continuously supplied with hot water from the boiler furnace 10, and the boiler water temperature is continuously maintained at a desired temperature throughout operation of the burner 11 under the control of the aquastat. The heat output of the continuously effective hot water heating element 13 is sufficient to supply the heating requirements under low load conditions. Under such conditions, when the room temperature to which thermostat 35 is responsive falls below a desired predetermined value, the room thermostat closes its contacts to energize the control relay 36 from the secondary transformer winding 22 through the conductors 23, 24, 50, thermostat 35, conductor 51, the energizing winding of relay 36, and conductors 52 and 26. Upon the resulting closure of the relay contact 37, the air circulator driving motor 17 is energized from supply lines L1, L2 through conductors 27 and 53, driving motor 17, conductors 54 and 55, relay contact 37, and conductor 56. When the resulting circulation of air over the low load heating element 13 raises the temperature in the room sufficiently to open the contacts of the room thermostat 35, relay 36 is deenergized and the circulation of the air is stopped. In this way the room thermostat 35 operates under light heating load conditions to start and stop the air circulation so as to maintain a desired predetermined room temperature.

When the outdoor temperature falls below a predetermined value and correspondingly increases the heating load above a predetermined value, the outdoor thermostat 41 closes its contacts to energize control relay 40 from the secondary transformer winding 22 through conductor 23, the outdoor thermostat 41, conductor 58, the energizing winding of relay 40, conductors 57, 52 and 26. Thereupon control relay 40 closes its contact 45 that is connected in parallel with the contact 37 by conductors 59 and 60. Consequently, the air circulator driving motor 17 is maintained energized continuously under high heating load conditions, irrespective of the operation of the control relay 36 under the control of the room thermostat 35.

The energization of control relay 40 by the outdoor thermostat 41 serves to interchange the air circulating means and the air heating means under the control of the room thermostat 35. Thus when the heating load is above a predetermined value, the energization and deenergization of control relay 36 by the room thermostat 35 operates to start and stop the burner driving motor 12. This is due to the fact that as long as the contact 39 of control relay 40 is closed, the closing and opening of contact 38 of relay 36 serves to energize and deenergize the motor starting relay 21, whereas the opening and closing of contact 37 has no controlling effect on the energization of the air circulating driving motor 17 as long as the parallel connected contact 45 is maintained closed.

In this way under high heating load conditions, the air circulating means is operated continuously while the burner of the boiler furnace 10 is started and stopped under the control of the room thermostat. Thus, when the room temperature decreases, the room thermostat 35 closes its contacts to effect operation of the burner so as to produce steam in the boiler 10 and thereby render the normally ineffective steam heating element 14 effective. When the combined heat output of the hot water heating element 13 and the steam heating element 14 is transferred by the continuously circulated air to raise the room temperature, thermostat 35 opens its contacts, thereby stopping operation of the burner and discontinuing the generation of steam in the boiler furnace 10.

In case the outdoor temperature rises so as to reduce the heating load below the predetermined value, then the outdoor thermostat 41 opens its contacts and thereby deenergizes control relay 40 to effect opening of both its contacts 39 and 45. This interchanges the circulator driving motor 17 and the burner driving motor 12 under the control of the room thermostat 35 so that the former is started and stopped by the room thermostat to maintain the desired room temperature, as previously explained.

Operation of Fig. 2

In the modification shown in Fig. 2, the burner driving motor 12 is provided with a control apparatus 70 of the well known three-wire type, and modifications of the circuit controlling contacts of the control relays 36a and 40a, as well as the circuit controlling contact 20a of the aquastat, are provided to enable the starting and stopping of burner operation to be controlled thereby in substantially the same manner as described in connection with Fig. 1. In this modified arrangement the aquastat contact 20a starts operation of the burner 11 upon engagement with the contact 71. This completes a circuit from the transformer secondary 22 through conductors 23 and 24, the aquastat contact 20a, contact 71, conductors 72 and 73, to terminal 74 of the three-wire burner operation control apparatus 70, and thence through the mid conductor 75 to the transformer. As a result, the burner 11 is operated to heat the water in the boiler 10 until the aquastat contact 20a is operated into engagement with contact 76. Thereupon a circuit is established to stop the burner operation extending from the transformer 22 through conductors 23, 24, contact 20a, conductor 77, contact 39a, conductors 78 and 79, and thence through the control apparatus 70 to the mid conductor 75. As a result of the closure of the circuit, the control apparatus 70 operates to deenergize the burner driving motor 12. In this way the hot water heating element 13 is maintained continuously effective.

The air circulator driving motor 17 is operated by the room thermostat 35 and relay 36a controlled thereby to maintain the desired room temperature in exactly the same manner as previously described in connection with Fig. 1 under light heating load conditions.

When the outdoor temperature decreases so as to increase the heating load above a predetermined value, then the outdoor thermostat 41 closes its contacts and energizes relay 40a. The resulting closure of relay contact 45a maintains the air circulator driving motor 17 continuously energized in the same way as previously described. In this case, relay contact 39a in its upper position enables the operation of the contact 38a of the relay 36a under the control of the room thermostat 35 to start and stop operation of the burner 11 in response to variations in the room temperature above and below the desired value. To start the burner motor 11, the circuit extends from transformer 22 through conductors 23, 24, aquastat contact 20a, contact 76, conductor 77, relay contact 39a in its upper position, conductor 80, contact 38a in its upper position, conductors 81 and 73, and thence through the mid conductor 75. To stop the burner operation, the circuit extends from conductor 80 through contact 38a in its lower position and conductors 82 and 79, and thence through the control apparatus to the mid conductor 75. Thus in this modified control system, the relay contact 39a shifts the control of the stopping of burner operation from the aquastat to the room thermostat, although either the aquastat or the room thermostat still may control the starting of the burner. In this way relay 40a serves to interchange the air circulator and the supplemental air heater under the control of the room thermostat, while effecting continuous operation of the air circulator under heavy heating load conditions.

What I claim as new and desire to secure by Letters Patent of the United States is:

1. An air conditioning heating system having in combination an air circulator, means including a room thermostat having relay means for controlling the operation of said air circulator, a boiler furnace having both steam and hot water heating elements in the path of the circulated air, combustion means for said boiler furnace, means including a boiler water temperature responsive thermostat for operating said combustion means to maintain the boiler water below the steaming temperature, an outdoor temperature responsive thermostat, and relay means controlled by said outdoor temperature responsive thermostat and interconnected with said first-mentioned relay means for interchanging said circulator and said combustion means under the control of said room thermostat to operate said boiler furnace to produce steam and for operating said air circulator continuously while the outdoor temperature is below a predetermined value.

2. A heating system having in combination means for circulating a heat transfer medium, means including a room thermostat for controlling said circulating means, a boiler furnace having both steam and hot water means for heating said medium, combustion means for normally operating said boiler furnace below the steaming temperature, and means including an outdoor thermostat for operating said circulating means continuously and for interchanging said circulating means and said combustion means under the control of said room thermostat to operate said boiler furnace to produce steam only when the outdoor temperature is below a predetermined value.

3. A heating system having in combination means for circulating a heat transfer medium, a boiler furnace having both steam and hot water means for heating said medium, combustion regulating means for normally maintaining said boiler furnace below the steaming temperature, a thermostat, and heating load responsive means for placing said circulating means under the control of said thermostat when the load is below a predetermined value and for operating said circulating means and placing said combustion regulating means under the control of said thermostat to raise steam in said boiler furnace only when the load is above said value.

4. A temperature control system having in combination a pair of cooperating temperature responsive means, one for responding to variations in a predetermined temperature condition to be controlled and the other for responding to variations in the ambient temperature, means for controlling said temperature condition including a heating means normally operating at a low heat output for heating a heat transfer medium, a circulator having control means operated under the selective control of said pair of temperature responsive means for circulating said heat transfer medium only when said temperature condition falls below a predetermined value while the ambient temperature is above a predetermined value and for continuously circulating said medium when the ambient temperature is below said value, and control means under the selective control of said pair of temperature responsive means for operating said heating means at a high heat output only when said condition falls below said predetermined value while the ambient temperature is below said value.

5. A temperature regulating variable load heating system having in combination means for circulating a heat transfer medium, means for heating said medium including a continuously effective low load heating element and a supplemental element for high load heating, automatic control means including a pair of thermostats, one responsive to the temperature regulated by the system and the other responsive to a variable ambient temperature determining the heating load of the system and each having selective operation control means for said circulating means and said high load heating element interconnected to effect operation of said circulating means in response to a predetermined variation in said regulated temperature and maintain said high load heating element ineffective while said ambient temperature is relatively high and to effect operation of said high load heating element in response to said predetermined variation in said regulated temperature and maintain continuous operation of said circulating means only while said ambient temperature is relatively low.

6. A heating system having in combination means for circulating a heat transfer medium, a plurality of means for heating said medium, one of said means being continuously effective, and control means including a thermostat and heating load responsive means for placing the operation of said circulator under the control of said thermostat when the load is below a predetermined value and for operating said circulating means continuously and placing the operation of the other of said heating means under the control of said thermostat when the load is above said value.

7. A heating system having in combination means for circulating a heat transfer medium, joint means for heating said medium, one of said heating means normally being ineffective, and control means including a thermostat and a heating load responsive device having means both for interchanging said circulating means and said normally ineffective heating means for operation under the control of said thermostat and for independently effecting operation of said circulating means while said one heating means is under the control of said thermostat.

8. A heating system having in combination means for circulating a heat transfer medium, joint means for heating said medium, one of said heating means normally being ineffective, and a pair of control devices separately responsive to related heating conditions, one having means for both interchanging said circulating means and said normally ineffective heating means for operation under the control of the other control device and for independently effecting operation of said circulating means while said one heating means is under the control of said other control device.

9. A space heating system having in combination means for circulating a heat transfer medium for the space, means for heating said medium, and heating control means including a space temperature responsive thermostat and an ambient temperature responsive thermostat for interchanging said circulator and said heating means under the control of said space temperature responsive thermostat.

10. A variable load heating system having, in combination, means for circulating a heat transfer medium, means for heating said medium, means including a control thermostat for effecting operation of said heating means under low load conditions, means including a second thermostat for controlling said circulating means under low load conditions, and heating load responsive means for operating said circulating means and interchanging said heating means for operation under the control of said second thermostat when the heating load is relatively high.

11. A heating system having, in combination, means for circulating a heat transfer medium, means for heating said medium including a second heat transfer medium in heat exchange relation with said first medium, a heater operable to heat said second medium, a main heating condition responsive control device, an auxiliary heating condition responsive control device having means for interchanging said circulating means and said heater for operation under the control of said main control device and for independently effecting operation of said circulating means while said heater is under the control of said main control device, and separate thermostatic means responsive to the temperature of said second heat transfer medium for operating said heater while said circulating means is under the control of said main control device.

12. A variable load heating system having, in combination, means for circulating a heat transfer medium, means including a second heat transfer medium for heating said first medium, means including a control thermostat for maintaining said second heat transfer medium at a predetermined temperature under low load conditions, a second thermostat for operating said circulating means under low load conditions, and heating load responsive means for operating said circulating means under relatively high load conditions and provided with means for increasing the temperature of said second heat transfer medium under the control of said second thermostat when the heating load is relatively high.

HARRY R. CRAGO.